Oct. 21, 1924.                                                          1,512,430
                                    J. G. LOY
                    MACHINERY FOR ASSEMBLING NAIL KNOBS
                    Filed Nov. 19, 1923        2 Sheets-Sheet 1
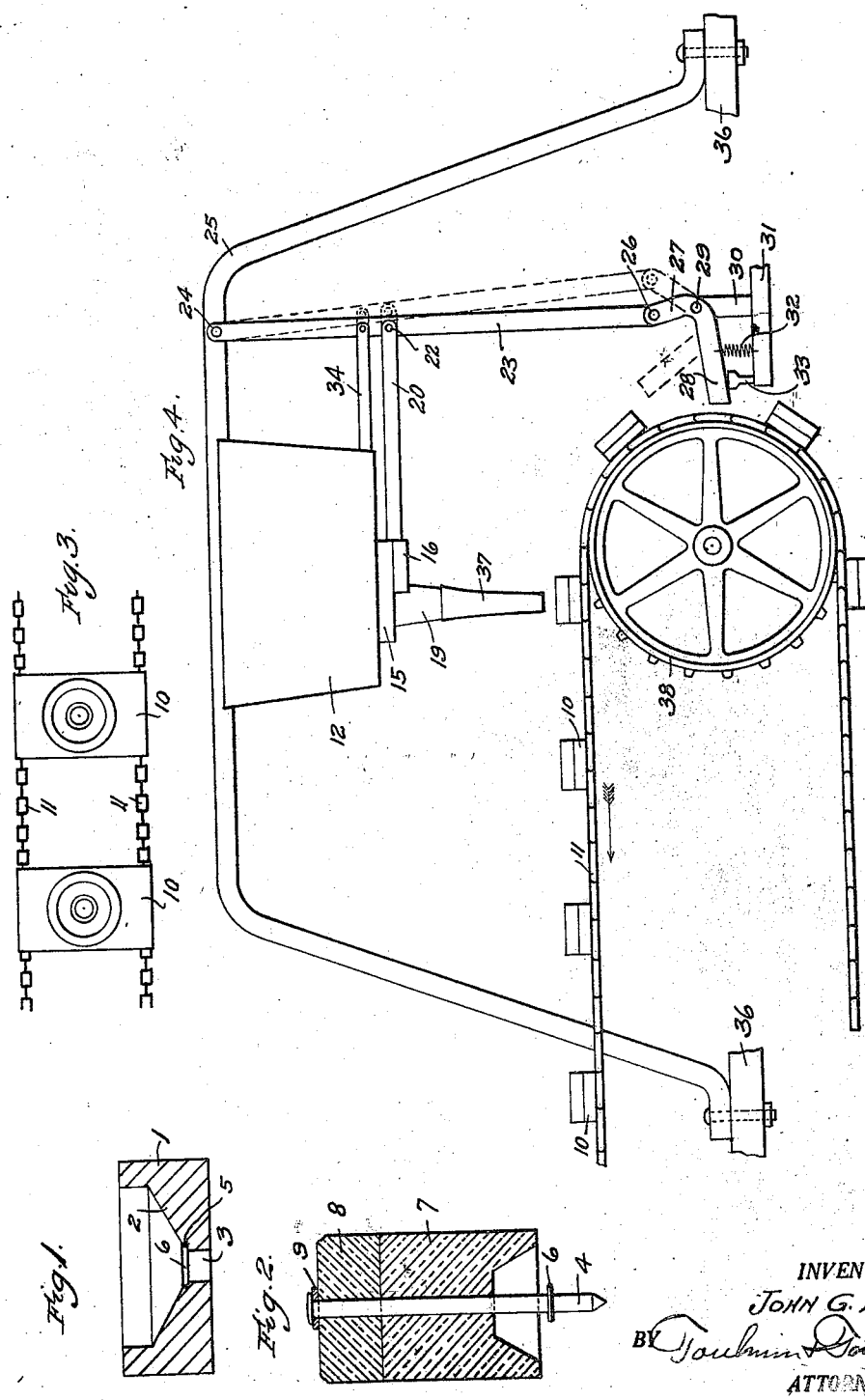
INVENTOR.
JOHN G. LOY
BY
ATTORNEYS.

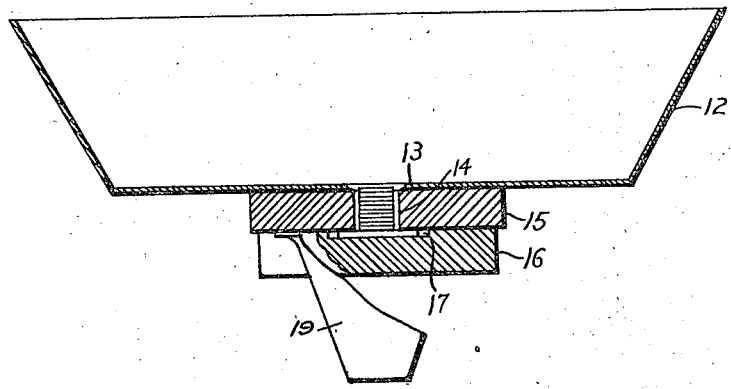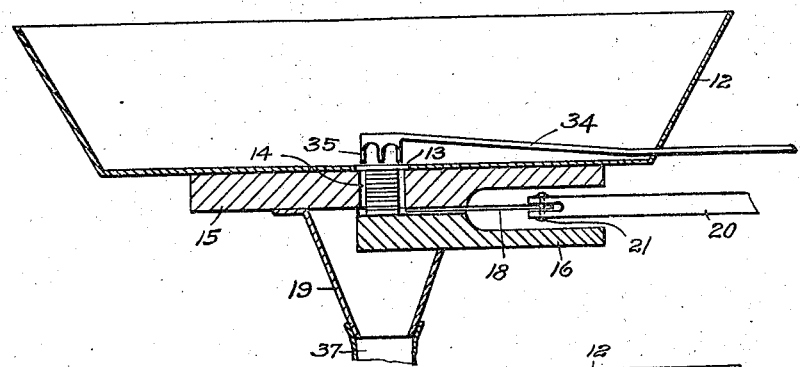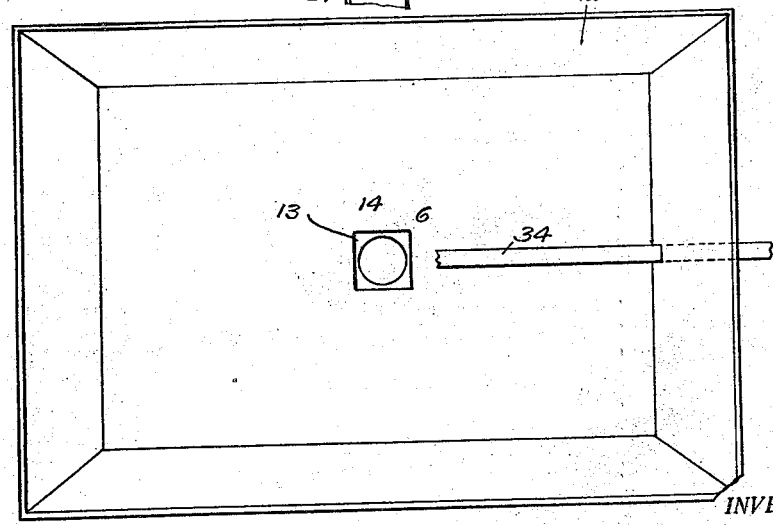

Patented Oct. 21, 1924.

1,512,430

UNITED STATES PATENT OFFICE.

JOHN G. LOY, OF CAREY, OHIO, ASSIGNOR TO THE FEDERAL PORCELAIN COMPANY, OF CAREY, OHIO, A CORPORATION OF OHIO.

MACHINERY FOR ASSEMBLING NAIL KNOBS.

Application filed November 19, 1923. Serial No. 675,532.

*To all whom it may concern:*

Be it known that I, JOHN G. LOY, a citizen of the United States, residing at Carey, in the county of Wyandot and State of Ohio, have invented certain new and useful Improvements in Machinery for Assembling Nail Knobs, of which the following is a specification, reference being had therein to the accompanying drawing.

My invention relates to machinery for assembling nail knobs, and, in particular, to a machine for directing the nail knob washers into the assembly cup.

It is the object of my invention to provide a machine for handling the very small metallic washers used in the assembly of nail knobs such as set forth in my copending application Serial Number 656,108.

The particular object of my invention is to provide a machine for delivering these small washers one by one automatically to each cup on the chain prior to the insertion in the cup of the porcelain portions of the nail knob and the nail. This washer is so small that it is very difficult to handle rapidly, and difficult to properly position and place in the moving cups.

It is the object of my invention to provide mechanism for handling such washers, and to insure the accurate and rapid placing of such washers in position in synchronism with the rest of the machine.

Referring to the drawings:

Figure 1 is a section through a cup carried on the chain, showing the typical washer in position.

Figure 2 is a section through the completely assembled nail knob, showing the washer positioned on the nail.

Figure 3 is a plan view of a portion of the chain and of the cups.

Figure 4 is a side elevation of that end of the assembly mechanism illustrating the washer handling mechanism.

Figure 5 is a section taken across the hopper showing a supply of washers in position to be ejected one by one.

Figure 6 is a section taken longitudinally of the hopper, showing the ejecting mechanism.

Figure 7 is a plan view of the hopper with the agitator partially broken away.

Referring to the drawings in detail:

1 is a cup body having a tapered inner surface 2, which communicates with an aperture 3 in the base of the cup through which the nail 4 is adapted to pass. A shoulder is cut away at the top of this aperture 3 as at 5 for the reception of the washer 6. This washer is a small metal disc with a hole in it. When the washer falls into the cup, the sloping side walls convey it to its point of location indicated in Figure 1.

The nail knob of which the washer is a part consists of a lower porcelain portion 7, which fits into the cup, and a cap portion 8. Both portions 7 and 8 have a passageway therethrough for receiving the nail 4. Between the top porcelain member 8 and the head of the nail is a fiber washer 9.

The problem is to locate the washer in the cup in proper position rapidly and economically. The cup is carried on a plate or lag 10, which bridges the gap between two conveying chains 11 and 11. There are a series of these cups, each one of which is used for the assembly of the nail knob as set forth in my previous application, Serial Number 656,108.

Above the chains 11 there is provided a hopper 12. This hopper has an aperture 13 in the base thereof, which coincides with an aperture 14 constituting an aligning reservoir for the washers, which are stacked one over the other in this reservoir. The reservoir is formed in the block 15. Beneath this reservoir and beneath the block 15 is a second guide block 16, having a cut-away portion 17, in which reciprocates an ejector 18. This ejector is a thin plate of metal of the thickness of a washer, and adapted to move the lowermost washer outwardly from beneath the column of washers in the reservoir. The washer when so ejected passes over the end of the guide block 16 into a chute 19, whence it passes by gravity into the cup 1, where it is automatically positioned by the sloping walls.

The ejector 18 is connected to an ejector arm 20. This arm is pivotally attached to the ejector 18 as at 21, and at its other end is pivotally attached as at 22 to an actuator arm 23. This actuator arm 23 is pivotally mounted as at 24 to a frame 25. The lower end of the actuator arm 23 is pivoted as at 26 to a bellcrank, one arm of which is designated 27 and the other arm is designated 28. This bellcrank is pivoted at 29 to a standard 30, mounted on a support 31. The bellcrank is normally pulled down by a helical spring 32 mounted upon the platform 31, and having its free end attached to the arm 28 of the bellcrank. The downward movement of this bellcrank is limited by a stop 33 mounted on the support 31 adapted to engage the outer end of the bellcrank arm 28.

Also attached to the actuator arm 23 is an agitator arm 34. This agitator arm projects into the hopper, and has on its free end a plurality of fingers 35, which agitate the disorderly mass of washers, bringing them into an orderly arrangement in the reservoir 14, and stacking them up as indicated.

The supporting bracket 25 is bolted to the floor or to a frame as at 36.

In actual practice it is preferred to make the lower end of the spout 19, as at 37, a tube of flexible material, so that in the event some foreign matter or a knob sticks in the cup 1, the spout will be merely moved to one side without breakage.

The chain itself moves with a step by step movement, which is synchronized with the movement of the ejector through the bellcrank mechanism.

In operation, the chain travels in the direction of the arrow over the sprocket wheel 38. As each lag with its cup comes in contact with the free end of the arm 28 of the bellcrank, the bellcrank is moved against the resistance of the spring 32, and simultaneously the ejector arm is withdrawn to allow the column of washers in the reservoir to descend upon the block 16. Upon the passage of a particular cup and lag and when they are actuated by the bellcrank, the spring returns the parts to their former position until the arm 28 rests upon the stop 33. In doing so, it has succeeded in agitating the agitator arm 34 and in bringing the ejector 18 in engagement with the lowermost washer, pushing this washer into the chute 19 through the flexible tube 37 into the cup 1. The continual agitation of the mass of washers by the agitator brings them one by one in proper position into the reservoir, where they are stacked in a column. When each cup is loaded with its respective washer, it can then pass on for the assembly of the nail knob as set forth and described in my application Serial Number 656,108, which operations form no part of the present invention.

It will be understood that the blocks 15 and 16 may be recessed for receiving the ejector arm 20.

It will be understood that I desire to comprehend within my invention such modifications as may be fairly embraced within it, and as may be found necessary in adapting it to various conditions in the art in the course of the application of the invention.

Having thus fully described my invention, what I claim as new, and desire to secure by Letters Patent, is:

1. In a nail knob machine, an endless conveyor, a succession of receptacles mounted thereon, each having a tapered interior ending in a washer seat and an orifice beneath the seat, a hopper for containing a supply of washers located above the receptacles, a reservoir beneath the hopper for containing a column of washers one over the other, a chute for delivering the washers one by one to the interior of the respective receptacles, and an ejector adapted to deliver one washer at a time from the column of washers to the chute, all arranged as substantially shown and described.

2. In a nail knob machine, an endless conveyor, a plurality of successive cups carried by said conveyor, said cups being adapted to position a washer dropped therein, a hopper mounted over said cups containing a disorganized mass of washers, said hopper having an aperture in the bottom thereof, a block having a reservoir located beneath said hopper and coinciding with said aperture, a guide-block beneath said reservoir, a reciprocating ejector adapted to move beneath said reservoir for ejecting washers one by one, a chute beneath said reservoir and beneath said supporting block beneath the ejector, and means adapted to be actuated by the conveyor for reciprocating said ejector which moves each washer individually from the reservoir over the block into the chute.

3. In a nail knob machine, an endless conveyor, a plurality of successive cups carried by said conveyor, said cups being adapted to position a washer dropped therein, a hopper mounted over said cups containing a disorganized mass of washers, said hopper having an aperture in the bottom thereof, a block having a reservoir located beneath said hopper and coinciding with said aperture, a guide-block beneath said reservoir, a reciprocating ejector adapted to move beneath said reservoir for ejecting washers one by one, a chute beneath said reservoir and beneath said supporting block beneath the ejector, means adapted to be actuated by the conveyor for reciprocating said ejector which moves each washer individually from the reservoir over the block into the chute, and a flexible spout for the bottom of the chute.

4. In a nail knob machine, an endless conveyor, a plurality of successive cups carried by said conveyor, said cups being adapted to position a washer dropped therein, a hopper mounted over said cups containing a disorganized mass of washers, said hopper having an aperture in the bottom thereof, a block having a reservoir located beneath said hopper and coinciding with said aperture, a guide-block beneath said reservoir, a reciprocating ejector adapted to move beneath said reservoir for ejecting washers one by one, a chute beneath said reservoir and beneath said supporting block beneath the ejector, means adapted to be actuated by the conveyor for reciprocating said ejector which moves each washer individually from the reservoir over the block into the chute, and an agitator synchronously moved with said ejector, said agitator being located in the hopper for arranging the washers one by one in a column in the reservoir.

In testimony whereof I affix my signature.

JOHN G. LOY.